United States Patent
Huth et al.

(10) Patent No.: US 10,298,389 B2
(45) Date of Patent: May 21, 2019

(54) PRIMARY UNIT AND OPERATING METHOD THEREFOR

(71) Applicant: Robert Bosch GmbH, Stuttgart (DE)

(72) Inventors: Christopher Huth, Leonberg (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 185 days.

(21) Appl. No.: 15/424,031

(22) Filed: Feb. 3, 2017

(65) Prior Publication Data

US 2017/0230170 A1    Aug. 10, 2017

(30) Foreign Application Priority Data

Feb. 10, 2016  (DE) ........................ 10 2016 201 989

(51) Int. Cl.
*H04L 9/08* (2006.01)

(52) U.S. Cl.
CPC ............ *H04L 9/085* (2013.01); *H04L 9/0819* (2013.01); *H04L 9/0852* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 2011/0019715 A1* | 1/2011 | Brisebois | ............. | H04B 7/0626 375/130 |
| 2011/0280397 A1* | 11/2011 | Patwar | .................... | H04L 63/06 380/44 |
| 2015/0016604 A1* | 1/2015 | Bellare | .................. | H04L 9/085 380/44 |

* cited by examiner

*Primary Examiner* — Fatoumata Traore
(74) *Attorney, Agent, or Firm* — Norton Rose Fulbright US LLP; Gerard Messina

(57) ABSTRACT

A method for operating a primary unit that exchanges information with at least one secondary unit, including the following: ascertainment by the primary unit of a first number of primary measured values, in particular measured values of an entropy source shared with the secondary unit; reconciliation by the primary unit of the first number of primary measured values, in particular with a corresponding number of secondary measured values that have been obtained by the secondary unit, to obtain reconciled primary measured values, the secondary measured values having been obtained by the secondary unit in particular from the shared entropy source; and application by the primary unit of a secret-sharing method to share secret data with the secondary unit, the secret-sharing method being executed as a function of the reconciled primary measured values.

13 Claims, 3 Drawing Sheets

| S1 | S2 | S2 |
|---|---|---|
| 1 | 20 | 22 |
| 2 | 21 | 19 |
| 3 | 22 | 23 |
| 4 | 23 | 22 |
| 5 | 24 | 24 |
| 6 | 22 | 24 |
| 7 | 22 | 22 |
| 8 | 20 | 20 |
| 9 | 21 | 22 |
| 10 | 22 | 20 |
| 11 | 21 | 20 |
| 12 | 21 | 21 |
| 13 | 21 | 23 |
| 14 | 22 | 22 |
| 15 | 21 | 19 |
| 16 | 21 | 19 |
| 17 | 22 | 21 |
| 18 | 22 | 20 |
| 19 | 22 | 21 |
| 20 | 24 | 24 |

PRIMARY UNIT AND OPERATING METHOD THEREFOR

RELATED APPLICATION INFORMATION

The present application claims priority to and the benefit of German patent application no. 10 2016 201 989.9, which was filed in Germany on Feb. 10, 2016, the disclosure of which is incorporated herein by reference.

FIELD OF THE INVENTION

The present invention relates to a method for operating a primary unit, the primary unit exchanging information with at least one secondary unit. Such information exchange takes place, for example, in advance of a cryptographically safeguarded communication between the two units, e.g. to negotiate a secret key between the two units via an insecure communication channel that could be tapped by an attacker. The present invention further relates to a secondary unit and to operating methods for the primary and the secondary unit.

SUMMARY OF THE INVENTION

An object of the present invention is to safeguard information exchange by the primary unit with other units, for example a secondary unit, so that attackers monitoring the information exchange acquire as little usable information as possible or none at all.

In the context of the method of the kind recited previously, this object is achieved in that the method has the following steps: ascertainment by the primary unit of a first number of primary measured values, in particular measured values of an entropy source shared with the secondary unit; reconciliation by the primary unit of the first number of primary measured values, in particular with a corresponding number of secondary measured values that have been obtained by the secondary unit, to obtain reconciled primary measured values, the secondary measured values having been obtained by the secondary unit in particular from the shared entropy source; application by the primary unit of a secret-sharing method to share secret data with the secondary unit, the secret-sharing method being executed as a function of the reconciled primary measured values.

The method advantageously makes it possible to safeguard information exchange between the primary and secondary unit.

Particularly advantageously, the method according to the present invention utilizes the correlation between the primary and secondary measured values. In an embodiment the primary and/or secondary measured values can encompass, for example, one or more properties of a radio channel used by both units for information exchange. For purposes of the present invention the "measured values" can encompass, for example, several values, for example presentable in digital and/or vector or matrix form and/or any other form, for example including a channel matrix H of a multiple input/multiple output (MIMO) radio system or the like. In general, it can be advantageous to represent individual measured values, or in the case of several measured values the measured values collectively, as a digital data word.

In a particular embodiment the primary measured values and/or the secondary measured values are obtained as a function of a physical communication channel, in particular as a function of a radio channel between the primary unit and the secondary unit, the primary measured values and/or the secondary measured values may be obtained as a function of a received signal strength indication (RSSI) and/or as a function of an indication of state properties of the radio channel, for example as a function of so-called channel state information (CSI) values, as defined e.g. in the context of fourth-generation (4G) cellular mobile radio systems, for example LTE or LTE Advanced; cf. for example 3GPP TS 36.213 V10.13.0 (2015-06), Chapter 7.2; 3rd Generation Partnership Project; Technical Specification Group Radio Access Network; Evolved Universal Terrestrial Radio Access (E-UTRA); Physical layer procedures (Release 10).

In a particular embodiment the measured values respectively used are therefore, for example, the received signal strength (RSSI) of a corresponding radio receiver of the respective primary and/or secondary unit. This makes use of the fact that radio channels are substantially reciprocal and exhibit at least at times (during a corresponding coherence time) a substantially constant pulse response. Alternatively or in supplementary fashion, CSI values can be used as measured values for purposes of the invention; these can likewise be ascertained, in a manner known per se, using corresponding radio receivers of the respective primary and/or secondary unit. The radio receivers are not obligatorily a constituent of the primary and/or secondary unit, but can also be embodied as separate physical units and can be connected via a data connection to the primary and/or secondary unit.

Application of the principle according to the present invention is also not limited to measured values relating to radio channels; comparable measured variables such as received signal strengths of wire-based or optical communication channels and/or a dispersion of optical signals in optical fibers, and the like, can instead also be used, provided there is assurance that both units obtain, by way of the respective measurements, measured values that are, which may be strongly, correlated with one another; this can usually be ensured by way of substantially reciprocal transmission paths, for example a radio signal transfer in free space or electrical or optical cables. Optical transfers in free space, in particular including in atmospheric or orbital systems, are likewise conceivable.

For example, measured values for purpose of the invention can be ascertained, for example, during reception of a message from the secondary unit by the primary unit and vice versa. For example, upon reception of such a message the primary unit can ascertain RSSI values as primary values, or a digital representation thereof.

Particularly, the principle according to the present invention can also be used for secret sharing between more than two units, in particular between one primary and several secondary units.

In a further embodiment provision is made that the reconciliation has the following step: application of a rounding function or sampling function to the primary measured values to obtain the reconciled primary measured values.

In a further embodiment provision is made that the reconciliation furthermore has the following steps: calculation of difference values by subtracting the primary measured values from the respective reconciled primary measured values; transfer of the difference values from the primary unit to the secondary unit. A reliable reconciliation of the primary and secondary measured values can thereby be accomplished. In particular, the secondary unit can use the difference values obtained from the primary unit to reconcile its own secondary measured values and thus bring them into conformity with the primary measured values of the primary unit.

In a further embodiment provision is made that the application of a secret-sharing method encompasses the execution of a Shamir-Blakley secret-sharing method. The method described in the following publication can be used, for example, in this context: Adi Shamir, How to share a secret, Communications of the ACM, 22(11):612-613, 1979. Further details regarding secret-sharing methods are described in the following publication: George Robert Blakley, "Safeguarding cryptographic keys," in Managing Requirements Knowledge, International Workshop on, pages 313-317, IEEE Computer Society, 1979.

In a further embodiment provision is made that the application of a secret-sharing method encompasses the following steps: calculation of a polynomial $$f(x) = s + \sum_{i=1}^{t-1} a_i \cdot x^i,$$

where s is a random number or pseudo-random number ascertained by the primary unit, where $x^i$ represents an index, in particular a time index, for primary measured values, in particular reconciled primary measured values, where $a_i$ represents the primary measured values, in particular the reconciled primary measured values, where i=1 to t−1, where t indicates how many primary measured values or how many reconciled primary measured values are used to calculate the polynomial f(x). The secondary unit can then reconstruct the polynomial f(x) using its own (reconciled) measured values and thereby ascertain the random number or pseudo-random number s using its own, i.e. secondary, measured values. Provision can be made for this purpose, for example, that the secondary unit evaluates the polynomial f(x) at the point x=0. The random number or pseudo-random number then exists in both units and can be used as a "shared secret", for example for encryption, to be performed in the future, of information or data that are to be exchanged between the units.

In a further embodiment provision is made that the primary unit ascertains which of the primary measured values have been successfully reconciled, only successfully reconciled primary measured values being used for performing the Shamir-Blakley secret-sharing method and/or for calculation of the polynomial f(x). Particularly reliable execution of the method is thereby ensured.

A method for operating a secondary unit that exchanges information with a primary unit is provided as a further manner of achieving the object of the present invention, the primary unit in particular executing the method according to the present invention. The present embodiment has the following steps: ascertainment by the secondary unit of a first number of secondary measured values, in particular of measured values of an entropy source (e.g. once again RSSI values or CSI values of a radio channel between the primary and secondary unit) shared with the primary unit; reconciliation by the secondary unit of the first number of secondary measured values, in particular with a corresponding number of primary measured values that have been obtained by the primary unit, to obtain reconciled secondary measured values, the primary measured values having been obtained by the primary unit in particular from the shared entropy source; application by the secondary unit of a secret-sharing method to share secret data with the primary unit, the secret-sharing method being executed as a function of the reconciled secondary measured values.

Further ways of achieving the object of the present invention are described by the coordinated claims relating to a primary unit and to a secondary unit.

For example, the primary unit and/or the secondary unit can respectively, for example, be part of a mobile or stationary apparatus or device. It is conceivable, for example, to equip mobile telephones with the primary and/or secondary unit according to the present invention, or to supplement existing computation units of such devices to include the functionality according to the present invention. Further embodiments can make provision to equip control devices, in particular of motor vehicles, with the primary and/or secondary unit according to the present invention.

In general, a control unit of the primary and/or secondary unit according to the present invention can possess a computation unit (e.g. microprocessor, digital signal processor, programmable logic module or the like, application-specific integrated circuit (ASIC)) for executing the method according to the present invention. Advantageously, in accordance with further embodiments the primary and/or secondary unit according to the present invention can furthermore possess a transmitting and/or receiving device for electromagnetic signals, in particular radio signals, wire-based signals (optical or electrical); and the receiving device can be configured, for example, to ascertain the measured values according to the present invention (e.g. RSSI or CSI parameters). In further embodiments it is conceivable to configure the primary and/or secondary units as an integrated semiconductor circuit (IC) or a sub-circuit of an IC.

Further advantageous embodiments are the subject matter of the further descriptions herein.

Further features, possible applications, and advantages of the invention are evident from the description below of exemplifying embodiments of the invention which are depicted in the Figures of the drawings. All the features described or depicted in this context, individually or in any combination, constitute the subject matter of the invention regardless of their grouping in the claims or their internal references, and regardless of their formulation or depiction respectively in the description or in the drawings.

DETAILED DESCRIPTION

Figure 1:
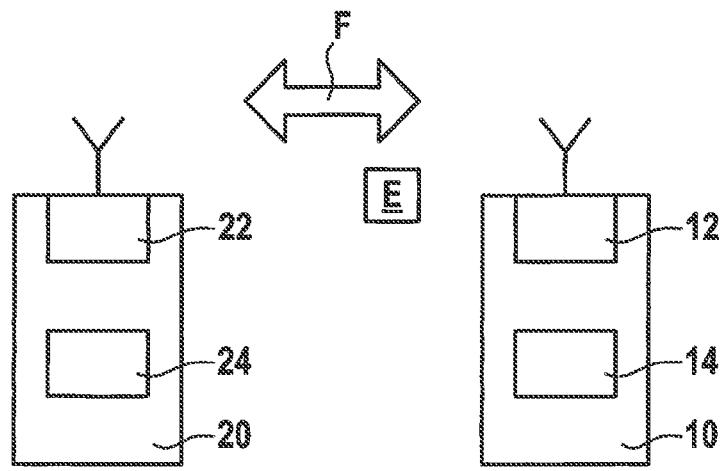
FIG. 1 is a schematic block diagram of a primary unit and a secondary unit, in accordance with an embodiment.

FIG. 1 is a schematic block diagram of a primary unit 10 and a secondary unit 20 in accordance with an embodiment. Primary unit 10 has a communication interface 12 for exchanging information with secondary unit 20, as well as a control unit 14 that controls information exchange with secondary unit 20 and optionally also further operation of primary unit 10. Control unit 14 can possess a computation unit (e.g. microprocessor, digital signal processor, programmable logic module or the like, ASIC) for this purpose.

Communication interface 12 is configured in the present case as a radio interface, for example having a conventional radio transceiver, so that primary unit 10 can exchange information with secondary unit 20 via a radio channel F.

Secondary unit 20 can analogously possess a communication interface 22 configured as a radio interface, as well as its own control unit 24 that can be configured comparably to control unit 14 of primary unit B. The two units 10, 20 consequently constitute a communication system 1000.

In addition to the two units 10, 20, FIG. 1 also depicts an attacker E who is, as applicable, monitoring and analyzing the information exchange between the two units 10, 20 via radio channel F.

Figure 2:
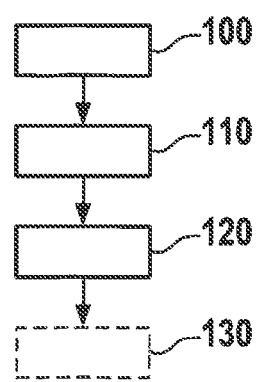
FIG. 2 is a schematic flow chart of an embodiment of the method according to the present invention.

Described below with reference to FIG. 2 is an embodiment of the method according to the present invention whose subject matter is the secure exchange of information between units 10, 20, for example with the goal of providing both units 10, 20 with a key ("shared secret") that is known in shared fashion but is otherwise secret (for example, with respect to a third party E), for example in the form of a digital data word, which they can use thereafter for encoded communication via radio channel F. The method according to the present invention serves in particular to enhance the security of information exchange between units 10, 20 in the phase in which (because of the absence of a shared secret key) they cannot already communicate in encoded fashion via radio channel F.

Firstly, in step 100, primary unit 10 ascertains a first number of primary measured values, for example RSSI measured values of radio interface 12, which are obtained during a communication with secondary unit 20. Radio channel F between the two units 10, 20 constitutes in this context an entropy source shared by the two units 10, 20. This ensures that secondary unit 20, analogously to primary unit 10, can in turn obtain secondary measured values, once again e.g. RSSI measured values of its radio interface 22, that can be relatively strongly correlated with the primary measured values.

Figures 4, 5:
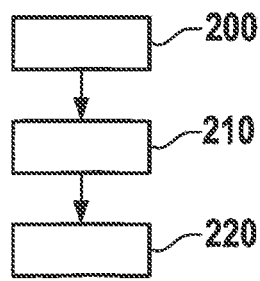
FIG. 4 schematically shows a flow chart of a further embodiment.
FIG. 5 is a table having measured values, in accordance with an embodiment.

The table of FIG. 5 shows in column S2, by way of example, the first number of primary measured values, which can be obtained from primary unit 10 and represent the aforesaid RSSI values. The measured values illustrated in column S2 can represent, for example, values that are already rounded or quantized, as obtained from a real transceiver 12. Measurement times associated with the measured values are contained in column S1.

In a subsequent step 110, primary unit 10 then reconciles the first number of primary measured values, in particular with a corresponding number of secondary measured values that have been obtained by secondary unit 20, to obtain reconciled primary measured values. As already described, the secondary measured values can have been obtained by secondary unit 20 in particular from the shared entropy source F. For this, secondary unit 20 can ascertain the secondary measured values, for example, while primary unit 10 is for its part ascertaining the primary measured values, i.e. in step 100 in accordance with FIG. 2. The table of FIG. 5 shows in column S3, by way of example, the first number of secondary measured values that can be obtained by secondary unit 20. The measured values illustrated in column S3 can represent, for example, values that are already rounded or quantized, as obtained from a real transceiver 22. Advantageously, the measured values of column S3 have been ascertained (by secondary unit 20) at least approximately simultaneously with the measured values of column S2 (by primary unit 10)(note the measurement times in column S1). A shared secret affected by noise (inter alia, because of the radio channel), in the form of the primary and secondary measured values, is thus present respectively in both units 10, 20 after step 100. The primary and secondary measured values are highly correlated with one another.

Figure 6:
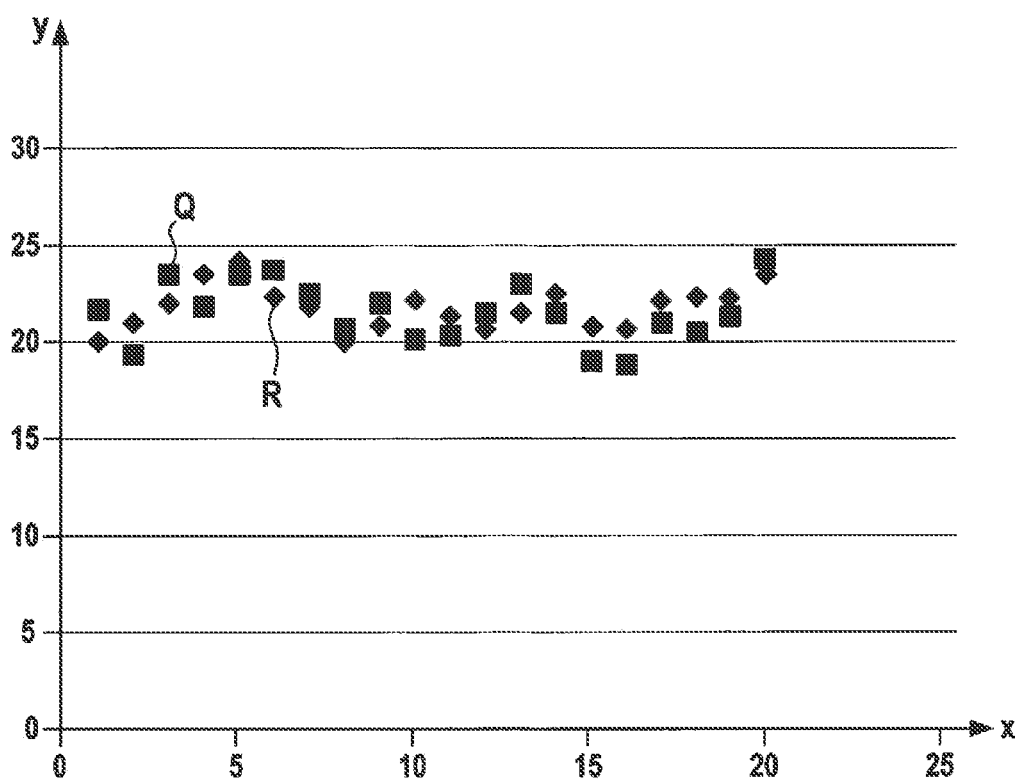
FIG. 6 is a diagram having the measured values of FIG. 5.

The primary and secondary measured values of the table of FIG. 5 are plotted by way of example in the diagram of FIG. 6. A horizontal axis x corresponds to a time index or a point in time at which the respective measured values have been obtained, and a vertical axis y indicates a numerical value of the measured values. The primary measured values are indicated here by the diamond-shaped symbol R, and the secondary measured values are indicated by the square symbol Q.

The reconciliation step 110 (FIG. 2) is accomplished to bring the primary measured values into even better conformity with the secondary measured values. In an advantageous embodiment, conventional reconciliation methods ("information reconciliation mechanisms") can be used.

After reconciliation 110, according to the present invention in step 120 a secret-sharing method is applied by primary unit 10 to share secret data with secondary unit 20, the secret-sharing method being performed as a function of the reconciled primary measured values. This advantageously ensures that an attacker E (FIG. 1) can only reconstruct the shared secret used by units 10, 20 if all the measured values ascertained by attacker E are identical to the reconciled primary and secondary measured values of the two units 10, 20. In other words, application according to the present invention of the secret-sharing method makes it considerably more difficult for an attacker E to ascertain the shared secret used by units 10, 20.

Further processing can optionally occur after step 120. For example, the shared secret used by units 10, 20 can now be used to perform information exchange thereafter in encoded fashion. A "privacy amplification" can also be used before the shared secret further processed in this fashion is used by units 10, 20 for information exchange.

In an embodiment provision is made to apply a rounding function to the primary measured values to obtain the reconciled primary measured values. This is indicated by step 1100 of the flow chart in accordance with FIG. 3.

For example, for the primary measured values according to column S2 of FIG. 5, a rounding function can be defined which maps the measured values onto the closest integral values at an interval of 3, for example . . . , 19, 22, 25, . . . . The primary measured values 19, 20, and 21 are thus each assigned to the rounded value 19, the primary measured values 22, 23, and 24 each to the rounded value 22, etc. The rounded values obtained in this manner correspond to the reconciled primary measured values.

In a further embodiment provision is made that reconciliation 110 (FIG. 2) further encompasses the following steps: calculation 1102 (FIG. 3) of difference values by subtracting the primary measured values from the respective reconciled primary measured values; transfer 1104 of the difference values from primary unit 10 (FIG. 1) to secondary unit 20.

For example, assuming the rounding method described by way of example above, the rounded value "22" is obtained for a measured value of "22" in column S2 of FIG. 5, so that step 1102 yields a difference value of 22−22=0; whereas assuming the rounding method described by way of example above, the rounded value "22" is obtained for a measured value of "21" in column S2 of FIG. 5, so that step 1102 yields a difference value of 22−21=1, and so forth.

The difference values obtained in this manner are transferred from primary unit 10 (FIG. 1) to secondary unit 20, whereupon secondary unit 20 can in turn reconcile the secondary measured values that it has ascertained. In an embodiment provision is made that secondary unit 20 adds the difference values to the secondary measured values to obtain summed measured values, and secondary unit 20 subjects the summed measured values to a rounding function, in particular the same rounding function that has already been used by primary unit 10, to obtain reconciled secondary measured values.

The result is that reconciled measured values which are highly correlated with one another, or at least some of which are identical to one another, are now present in both units 10, 20.

In a further embodiment provision is made that application 120 (FIG. 2) of the secret-sharing method encompasses the execution of a Shamir-Blakley secret-sharing method. The method described in the following publication can be used, for example, in this context: Adi Shamir, How to share a secret, Communications of the ACM, 22(11):612-613, 1979. Further details regarding secret-sharing methods are described in the following publication: George Robert Blakley, "Safeguarding cryptographic keys," in Managing Requirements Knowledge, International Workshop on, pages 313-317, IEEE Computer Society, 1979.

Alternatively, other known secret-sharing methods can also be executed in step 120.

In a further embodiment provision is made that the application of a secret-sharing method encompasses the following steps: calculation of a polynomial $$f(x) = s + \sum_{i=1}^{t-1} a_i \cdot x^i,$$

where s is a random number or pseudo-random number ascertained by primary unit 10, where $x^i$ represents an index, in particular a time index, for primary measured values, in particular reconciled primary measured values (the time index $x^i$ being comparable to the values of column S1 of the table of FIG. 5), where $a_i$ represents the primary measured values, in particular the reconciled primary measured values (comparable to the values of column S2 of the table of FIG. 5), where i=1 to t−1, where t corresponds to the degree of the polynomial f(x) and indicates how many primary measured values or how many reconciled primary measured values are used to calculate the polynomial f(x).

Using its own secondary measured values, secondary unit 20 can reconstruct the polynomial f(x), ascertain the random number s, and thereby also come into possession of the shared secret s. The value s can be used thereafter, for example, to encode data between units 10, 20.

The flow chart of FIG. 4 shows one possible method sequence in secondary unit 20. In a first step 200, secondary measured values are ascertained by secondary unit 20, analogously to and may be simultaneously with ascertainment 100 (FIG. 2) of the primary measured values by primary unit 10. In step 210 (FIG. 4), a reconciliation of the secondary measured values is accomplished by the secondary unit. Details of this have already been described above with reference to FIG. 3. Lastly, application by secondary unit 20 of a secret-sharing method is established in step 220.

In an embodiment provision can be made in this context (step 220) for secondary unit 20 to ascertain the polynomial f(x), or the number s contained therein, using Lagrange polynomial interpolation in accordance with the following equation:

$$\sum_{i=1}^{r-1} s_i \cdot \prod_{j \ne i} \frac{x - x_j}{x_i - x_j}.$$

In other words, the primary unit and the secondary unit can consequently use their shared secret (see FIG. 5), present in the form of the (reconciled) measured values, to construct or reconstruct the polynomial f(x) and then to evaluate it at a predefined point, for example x=0, to ascertain the secret s predefined by unit 10.

In a further embodiment provision is made that primary unit 10 (FIG. 1) ascertains which of the primary measured values have successfully been reconciled, only successfully reconciled primary measured values being used for execution of the Shamir-Blakley secret-sharing method and/or for calculation of the polynomial f(x), as described above. The security of the method according to the present invention can thereby be further enhanced, since an attacker requires, for a successful attack, measured values that conform to the primary measured values or the reconciled primary measured values at least as well as do the secondary measured values or the reconciled secondary measured values of the secondary unit.

The principle according to the present invention as described above makes it possible to improve conventional reconciliation methods in which two or more units exchanging information with one another have access to a shared entropy source (e.g. radio channel). In particular, conventional physical layer-based key generation (PHYSEC) methods and quantum key distribution (QKD) methods can thereby be enhanced in terms of their security against attackers E (FIG. 1). In contrast to the principle according to the present invention, the conventional reconciliation methods cannot ensure that an attacker E is not capable of reconstructing a secret (magnitude "s", see above; for example, a random number or pseudo-random number) agreed upon between the primary unit and secondary unit solely from the measured values ascertained on the part of attacker E.

The principle according to the present invention already described above with its various embodiments therefore proposes the following steps, summarized once again below:

Ascertainment by both units of measured values, in particular of a sufficient number of measured values (e.g. n measured values), for example RSSI or CSI values of a shared radio channel F (FIG. 1) or of another shared entropy source.

Figure 3:
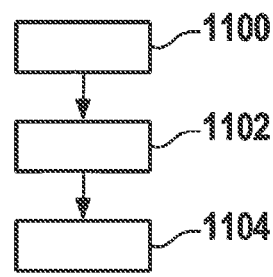
FIG. 3 schematically shows a flow chart of a further embodiment.

Reconciliation of the measured values using conventional reconciliation methods and/or the embodiments described above (see e.g. FIG. 3). Particularly, a reconciliation method using "weak" parameters may be utilized, so that an attacker E is then guaranteed not to be able to reconstruct a secret s agreed upon between units 10, 20 if the reconciled primary and reconciled secondary measured values of the two units 10, 20 are more similar to one another than measured values ascertained by attacker E.

Application of a secret-sharing method, to reconstruct a "message M," utilizing the reconciled measured values. In other words, the primary and secondary unit can treat the reconciled measured values as if they were parts of the secret of an original message M. According to an embodiment a conventional secret-sharing method can be used, for example with the aid of a trustworthy third party (for an example, see: Bruce Schneier, Applied Cryptography: Protocols, Algorithms, and Source Code in C, John Wiley & Sons, 2007). Alternatively, so-called "verifiable" secret-sharing methods can be used, in which a third party is not necessary (for an example, see: Bruce Schneier, Applied Cryptography: Protocols, Algorithms, and Source Code in C, John Wiley & Sons, 2007). As a further alternative, it is also possible to use secret-sharing methods using the disenrollment principle, which enable subsequent exclusion of non-trustworthy parties (for an example, see: K. M. Martin, Untrustworthy participants in perfect secret sharing schemes, in Institute of Mathematics and its Applications Conference Series, volume 45, pages 255-255, Oxford University Press, 1993).

Lastly, the message M can optionally be used as a shared secret by both units 10, 20, for example for encoding data. Alternatively or in supplementary fashion, the message M or the shared secret can be subjected to further, in particular cryptographic, processing, for example a privacy amplification function.

In other words, the principle according to the present invention is based not on directly using the reconciled measured values as a basis for a shared secret, but rather on applying a secret-sharing method to the reconciled measured values; this offers enhanced security against attack as compared with conventional approaches. In a conventional method, an attacker E (FIG. 1) could estimate the reconciled measured values with sufficient precision for a successful attack if he or she could measure measured values similar to those of the two units 10, 20. The principle according to the present invention, conversely, utilizing a secret-sharing method, enables units 10, 20 to generate a shared secret s that can only be reconstructed by attacker E if all the "reconciled" measured values calculated by attacker E are identical to the reconciled measured values of primary unit 10 and of secondary unit 20. Because the secret s is selected unrestrictedly and is not predefined by a physical channel, the secret s can be truly random ("true random number generator").

In the context of application of the principle according to the present invention using the secret-sharing method, it is noteworthy that it is sufficient for the authorized parties (units 10, 20) to have only m (less than or equal to) n shared measured values to reconstruct the shared secret s. In other words, provision is made in an embodiment that the two units 10, 20 agree to use only m≤n shared measured values for reconciliation according to the present invention and for the subsequent step 120 (FIG. 20). The agreement can occur before the sequence according to FIG. 2 or, for example, can be permanently set or programmed in units 10, 20. Alternatively or in supplementary fashion, the number n of measured values and/or the number m of reconciled measured values to be reconciled and used for secret sharing can be selected dynamically, e.g. as a function of at least one operating variable (e.g. current properties of radio channel F (FIG. 1), state of an energy supply of unit(s) 10, 20, etc.) of primary unit 10 and/or secondary unit 20.

The option of selecting a number m<n makes it even more difficult for attacker E to align his or her measured values with reference to the communication between units 10, 20 which is to be attacked. For example, the units can select a relatively small number t, for example t<(n/4), for m, so that in total only a small portion of all n measured values can be reconciled. Irrespective of this, the two units 10, 20 can use only m or t successfully reconciled measured values to derive a secret that is shared by units 10, 20 and cannot be ascertained by attacker E. In particular, based on the principle according to the present invention, attacker E already cannot derive the shared secret if he or she possesses only m−1, or fewer, reconciled measured values.

Particularly advantageously, it is thus possible by way of the principle according to the present invention to prevent attacker E from arriving at intermediate results, such as the reconciled measured values, which are identical to the reconciled measured values of the authorized parties or units 10, 20. With conventional reconciliation schemes, it is sufficient for an attacker to possess measured values similar to those of the authorized parties 10, 20 to reconstruct reconciled measured values with comparatively little effort, and thereby be able to ascertain a shared secret. When the principle according to the present invention is applied, conversely, the attacker must ascertain all the reconciled measured values potentially usable for secret sharing, which considerably enhances security.

Further advantages of the principle according to the present invention with respect to conventional approaches are set forth below:

The shared secret s that units 10, 20 agree upon can be completely (pseudo-)random-based (because of the unrestricted selection of s by primary unit 10), in contrast to conventional approaches in which the shared secret is derived from reconciled measured values of units communicating with one another.

When the above-described polynomial f(x) is used, an attacker needs at least t data points of the Shamir-Blakley scheme for secret sharing, but he or she (unlike the authorized units 10, 20) cannot obtain them because he or she can perform measurements of the radio channel F between units 10, 20 which are less precise as compared with units 10, 20.

Because units 10, 20 can ascertain, based on the reconciliation of the primary and secondary measured values, which of the primary and secondary measured values have been successfully reconciled between units 10, 20, primary unit 10 can utilize the secret-sharing method used according to the present invention, for example a Shamir-Blakley scheme, specifically using the successfully reconciled measured values, so that an attacker requires, for a successful attack, measured values that are at least exactly as precise as the secondary measured values of secondary unit 20.

Lastly, the principle according to the present invention also allows application to groups of more than two units. In particular using the secret-sharing method used according to the present invention, the principle illustrated above with reference to the two units 10, 20 can also be expanded to groups having more than two units 10, 20.

Particularly, the principle according to the present invention can also be used for secret sharing between more than two units 10, 20, in particular between one primary unit 10 and several secondary units 20.

What is claimed is:

1. A method for operating a primary unit that exchanges information with at least one secondary unit, the method comprising:

ascertaining, by the primary unit, a first number of primary measured values, in particular measured values of an entropy source shared with the secondary unit, wherein the entropy source is a shared communication channel shared by the primary unit and the secondary unit, the shared communication channel being a radio communication channel or an optical communication channel or a wired communication channel;

reconciling, by the primary unit, the first number of primary measured values, in particular with a corresponding number of secondary measured values that have been obtained by the secondary unit, to obtain reconciled primary measured values, the secondary measured values having been obtained by the secondary unit in particular from the shared entropy source; and applying, by the primary unit, a secret-sharing process to share secret data with the secondary unit, the secret-sharing process being executed as a function of the reconciled primary measured values, wherein the applying of the secret-sharing process includes: calculating a value of polynomial $$f(x) = s + \sum_{i=1}^{t-1} a_i \cdot x^i,$$

where s is a random number or pseudo-random number ascertained by the primary unit, where $x^i$ represents a time index for the reconciled primary measured values, where $a_i$ represents the reconciled primary measured values, where i=1 to t−1, where t indicates how many primary measured values or how many reconciled primary measured values are used to calculate the polynomial f(x);

transmitting, by the primary unit, the calculated value of the polynomial to the secondary unit;

encoding data, by the primary unit, using a shared secret, wherein the shared secret is the random number or pseudo-random number ascertained by the primary unit; and communicating between the primary unit and the secondary unit over a communication channel using the encoded data.

2. The method of claim 1, wherein the primary measured values and/or the secondary measured values are obtained as a function of a physical communication channel, in particular as a function of a radio channel between the primary unit and the secondary unit, the primary measured values and/or the secondary measured values in particular being obtained as a function of a received signal strength indication (RSSI) and/or as a function of an indication of state properties of the radio channel.

3. The method of claim 1, wherein the reconciling includes: applying a rounding function or sampling function to the primary measured values to obtain the reconciled primary measured values.

4. The method of claim 3, wherein the reconciling further includes: calculating difference values by subtracting the primary measured values from the respective reconciled primary measured values; and transferring the difference values from the primary unit to the secondary unit.

5. The method as recited in claim 1, wherein the primary measured values are a function of signal strength (RSSI) or channel state information (CSI) values ascertained using a radio receiver of the primary unit.

6. The method as recited in claim 1, further comprising:
reconciling, by the secondary unit, the secondary measured values with the primary measured values;
receiving, by the secondary unit, the transmitted calculated value from the primary unit; and
ascertaining, by the secondary unit, the shared secret key based on the transmitted calculated value and the reconciled secondary measured values.

7. The method as recited in claim 1, wherein the primary unit includes a computation unit configured to perform the method and including hardware.

8. The method as recited in claim 7, wherein the hardware includes any of the following: a microprocessor, a digital signal processor, a programmable logic module, or an application specific integrated circuit.

9. A primary unit for exchanging information with at least one secondary unit, comprising:
a primary device configured to perform the following:
ascertaining, by the primary unit, a first number of primary measured values, in particular measured values of an entropy source shared with the secondary unit, wherein the entropy source is a shared communication channel shared by the primary unit and the secondary unit, the shared communication channel being a radio communication channel or an optical communication channel or a wired communication channel;

reconciling, by the primary unit, the first number of primary measured values, in particular with a corresponding number of secondary measured values that have been obtained by the secondary unit, to obtain reconciled primary measured values, the secondary measured values having been obtained by the secondary unit in particular from the shared entropy source; and applying, by the primary unit, a secret-sharing process to share secret data with the secondary unit, the secret-sharing process being executed as a function of the reconciled primary measured values, wherein the applying of the secret-sharing process includes: calculating a value of polynomial $$f(x) = s + \sum_{i=1}^{t-1} a_i \cdot x^i,$$

where s is a random number or pseudo-random number ascertained by the primary unit, where $x^i$ represents a time index for the reconciled primary measured values, where $a_i$ represents the reconciled primary measured values, where i=1 to t−1, where t indicates how many primary measured values or how many reconciled primary measured values are used to calculate the polynomial f(x);

transmitting, by the primary unit, the calculated value for the polynomial to the secondary unit;

encoding data, by the primary unit, using a shared secret key, wherein the shared secret key is the random number or pseudo-random number ascertained by the primary unit; and communicating between the primary unit and the secondary unit over a communication channel using the encoded data.

10. The primary unit of claim 9, wherein the primary measured values and/or the secondary measured values are obtained as a function of a physical communication channel, in particular as a function of a radio channel between the primary unit and the secondary unit, the primary measured values and/or the secondary measured values in particular being obtained as a function of a received signal strength indication (RSSI) and/or as a function of an indication of state properties of the radio channel.

11. The primary unit as recited in claim 9, wherein the primary measured values are a function of signal strength (RSSI) or channel state information (CSI) values ascertained using a radio receiver of the primary unit.

12. The primary unit as recited in claim 9, wherein the primary unit includes a computation unit configured to perform the ascertaining, reconciling, applying, transmitting, encoding, and communication, wherein the computation unit includes hardware.

13. The primary unit as recited in claim 12, wherein the hardware includes any of the following: a microprocessor, a digital signal processor, a programmable logic module, or an application specific integrated circuit.

\* \* \* \* \*